United States Patent [19]

Hörler

[11] Patent Number: 4,541,784
[45] Date of Patent: Sep. 17, 1985

[54] CENTRIFUGAL LUBRICATING OIL PUMP OF AN EXHAUST GAS TURBOCHARGER

[75] Inventor: Hansulrich Hörler, Zurich, Switzerland

[73] Assignee: BBC Brown, Boveri & Company, Limited, Baden, Switzerland

[21] Appl. No.: 603,319

[22] Filed: Apr. 24, 1984

[30] Foreign Application Priority Data

Apr. 29, 1983 [CH] Switzerland ............... 2310/83

[51] Int. Cl.$^4$ ............... F04B 17/00; F02C 7/06
[52] U.S. Cl. ............... 417/407; 60/39.08; 384/465; 184/31
[58] Field of Search ............... 417/405, 406, 407; 384/465, 471, 472; 184/6.11, 6.16, 29, 31, 26; 60/39.08

[56] References Cited

U.S. PATENT DOCUMENTS

| | | | |
|---|---|---|---|
| 2,042,575 | 6/1936 | Worth | 384/472 |
| 2,929,663 | 3/1960 | Hoeltje | 384/465 |
| 3,048,118 | 8/1962 | Erd | 415/175 |
| 3,069,133 | 12/1962 | Swearingen | 415/175 |
| 3,180,568 | 4/1965 | Oettle | 415/175 |
| 3,318,644 | 5/1967 | Johnson | 184/31 |
| 3,410,616 | 11/1968 | Dee | 417/407 |
| 3,457,871 | 7/1969 | Herger | 184/26 |
| 4,251,186 | 2/1981 | Chomel et al. | 184/31 |
| 4,323,289 | 4/1982 | Suzuki | 384/465 |

FOREIGN PATENT DOCUMENTS

| | | | |
|---|---|---|---|
| 525331 | 9/1940 | United Kingdom | 417/406 |
| 832676 | 4/1960 | United Kingdom | 417/407 |

Primary Examiner—Carlton R. Croyle
Assistant Examiner—Timothy J. Thorpe
Attorney, Agent, or Firm—Burns, Doane, Swecker & Mathis

[57] ABSTRACT

In a centrifugal lubrication system of an exhaust gas turbocharger, the pump rotor is provided with two laterally located hollow spaces and is fastened on the turbocharger shaft between two shaft bearings. The shaft bearings are each located between an oil suction pipe and a hollow space of the pump rotor. The oil is sucked up from the oil sump, through the injection nozzles and through the shaft bearings.

4 Claims, 1 Drawing Figure

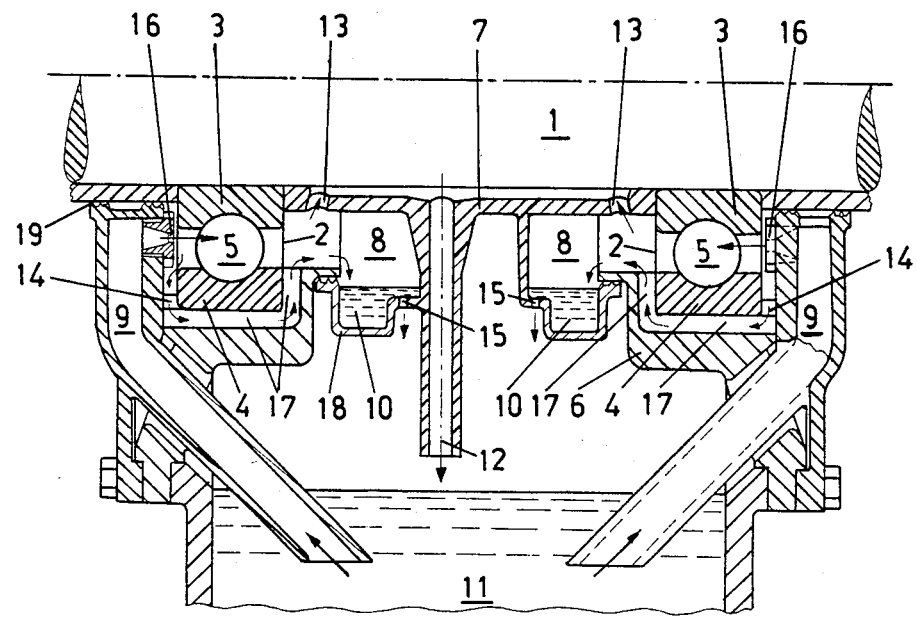

CENTRIFUGAL LUBRICATING OIL PUMP OF AN EXHAUST GAS TURBOCHARGER

FIELD OF THE INVENTION

The invention concerns oil pumps for directing lubrication to bearings of rotating machinery generally and more particularly, centrifugal lubricating oil pumps of exhaust gas turbochargers.

BACKGROUND OF THE INVENTION

Exhaust gas turbochargers are often equipped with rolling bearings which, because of the high rotational speeds, have to be lubricated and cooled by large quantities of injected oil. However, during starting and at low rotational speeds, they can operate without any oil at all. It is desired that the quantity of injected oil be accurately determined and be increased approximately in proportion to the rotational speed. The injection of the oil into the rolling body race of the rolling bearing should take place near the bearing inner ring. The lubricating oil is sucked from the oil sump by a centrifugal pump located on the shaft of the turbocharger and is passed through the rolling bearing. Part of the oil can be injected for cooling purposes directly onto the thermally heavily loaded parts such as, for example, the bearing inner ring.

Centrifugal lubricating oil pumps of the type mentioned above are known, for example, from the Swiss Pat. No. 451,714. In this device the lubricating oil pump is attached to one end of the turbocharger shaft and, for this reason, can only be used in turbochargers with external bearings because this system depends on a relatively small internal diameter of the rotating oil ring relative to the bearing diameter, which, for design reasons, cannot always be attained in turbochargers with internal bearings.

The lubrication of the shaft bearing of an exhaust gas turbocharger with internal bearings is normally carried out by means of the lubrication circuit of the engine or, in the case of the relatively dirt sensitive roller bearings, by means of an external pump, for example a gear or piston pump. Such a pump requires a separate drive and much space; in addition, it requires maintenance and the failure rates of individual components are not negligible.

OBJECTS AND SUMMARY OF THE INVENTION

The object of the invention is, therefore, to produce a highly effective reliable lubricating oil pump which can also be used for exhaust gas turbochargers with internal bearings.

This object is achieved by a centrifugal lubricating oil pump constructed in accordance with the present invention, which pump has a pump rotor on the turbocharger shaft between the two shaft bearings, wherein each bearing is located between an upper end of an oil suction pipe and an annular chamber of the pump rotor.

The advantages attained by means of the invention are mainly to be seen in that an adequate injection pressure is attained in a centrifugal lubricating oil pump provided for exhaust gas turbochargers with internal bearings, even where there is no design possibility of directly using the oil pressure generated in a rotating annulus of oil, due to the centrifugal force effect, for injection into the shaft bearing.

The location of a centrifugal lubricating oil pump directly on the shaft of an exhaust gas turbocharger with internal bearings eliminates the factors which can adversely affect the availability of the turbocharger.

BRIEF DESCRIPTION OF THE DRAWING

A preferred embodiment of the subject matter of the invention is shown in the drawing.

The single FIGURE shows, in longitudinal section, a centrifugal lubricating oil pump of an exhaust gas turbocharger with internal bearings.

The flow direction of the lubricating oil is indicated by arrows. Those parts of the exhaust gas turbocharger which are not important to the invention, such as the turbine, compressor, etc., are omitted.

DETAILED DESCRIPTION OF THE PREFERRED EMBODIMENT

The turbocharger shaft 1 is supported in a casing 6 by means of shaft bearings 2, consisting of a bearing inner ring 3, a bearing outer ring 4 and rolling bodies 5. A pump rotor 7 equipped with radially located air vent ducts 12 is fastened to the turbocharger shaft 1. The lower end of an oil suction pipe 9 is immersed in an oil sump 11. The upper end of the oil suction pipe 9 is connected to a hollow space 8, in which a vacuum is generated due to the suction effect of the air vent ducts 12.

During operation, the oil sucked from the oil sump 11 through the bearing 2 forms, due to the centrifugal force effect, a rotating annulus of oil 10 in the hollow annular chamber 8. The oil pressure in this rotating annulus of oil 10 increases with increasing radius.

A build-up of pressure in a rotating annulus of oil, starting at a small radius, would be the necessary condition for injecting the oil from the rotating annulus of oil directly into a bearing with a small diameter because the injection of the oil into the rolling body race must take place near the bearing inner ring 3. In the case of a lubricating oil pump provided for an exhaust gas turbocharger with internal bearings, it is not possible to make the inner radius of the rotating annulus of oil substantially smaller than the radius at which the injection nozzles 16 are located. This would be the necessary condition for effective injection into the shaft bearing 2 because the turbocharger shaft 1 cannot be reduced in thickness at the position of the pump rotor 7 for strength reasons and the bearing diameter selected cannot be made larger because of the increased centrifugal forces, the frictional energy and the material temperature.

In accordance with the invention, the pump rotor 7 is now equipped with two laterally located hollow spaces 8 and is fastened onto the turboshaft 1 between two shaft bearings 2. The shaft bearings 2 are each located between an oil suction pipe 9 and a hollow space 8 of the pump rotor 7. This has the effect that the oil is sucked from the oil sump 11 through the injection nozzles 6 and through the shaft bearing 2.

In addition, an annular oil gap 14 is located between the casing 6 and the end surfaces, facing towards the injection nozzles 16, of the bearing outer ring 4. Oil ducts 17 are located at the contact surfaces between the cylindrical outer surface of the bearing outer ring 4 and the casing 6 and between the casing 6 and the end surface, facing away from the injection nozzle 16, of the bearing outer ring 4.

By this means, free oil drainage is obtained from both sides of the bearing and the amount of splashing is reduced. The oil can flow away directly in an inward direction, whereas it runs in an outwards direction with swirl caused by the rolling bodies 5 into an oil gap 14 and is forced, by the centrifugal force effect of the annulus of oil rotating in this position, radially inwards again through the grooves 17 as far as the internal diameter of the outer ring 3. The oil runs further into the hollow spaces 8 of the pump rotor 7 and there forms rotating annuli of oil 10. The total oil quantity is now passed through the ejection holes 15 and collected in the oil sump 11.

The ejection holes 15 located on the pump rotor 7 are so dimensioned and are located just so far radially outwards that their internal opening is sure to be provided with a small depth of cover by the internal radius of the rotating annulus of oil 10. This achieves the advantage that, with a minimum loss of swirl performance, the air is prevented from penetrating through the ejection holes 15 into the hollow spaces 8, which are under vacuum.

The hollow space 8 of the pump rotor 7, in which the rotating annulus of oil 10 forms, has a pocket 18 which acts as a dirt separator. In order to maintain a constant pressure in the hollow space 8, the air arriving through the shaft seal 19 and along with the oil has to be removed. This is achieved by means of the suction effect of the air vent ducts 12. In order to prevent the emergence of lubricating oil through the air separation ducts 12 of the pump rotor 7, the air first passes radially inwards through the oil-trap holes 13, through which the oil cannot follow because of the centrifugal force effect. These oil-trap holes 13 are located as far radially inwards as possible.

It is very important to the oil suction pipe 9 that there should be no throttle points because, in this case, the oil flow would be insufficient.

The method of operation of a centrifugal lubricating oil pump is described below.

In the air vent ducts 12 of the pump rotor 7, the air is forced outwards by the centrifugal force effect during operation; this causes a vacuum in the hollow spaces 8 and the oil is sucked from the oil sump 11 through the oil suction pipes 9, the stationary injection nozzles 16 and the shaft bearings 2. Because of wall friction, a rotating annulus of oil 10 forms in the hollow spaces 8, the inner radius of which annulus of oil depends on the oil supply and the oil ejection through the ejection holes 15. An oil pressure builds up in the rotating annulus of oil 10 due to the centrifugal force effect. Any possible dirt in the oil is deposited on the outer internal wall of the hollow space 8, which is formed in the shape of a pocket 18, and is removed from time to time.

With correctly dimensioned ejection holes 15, a certain vacuum is generated automatically in the hollow space 8, provided that the inner diameter of the annulus of oil is a few millimeters smaller than the diameter at which the openings of the ejection holes 15 are located.

If the diameter of the annulus of oil decreases, the oil pressure at the openings into the ejection holes 15 increases, more oil is ejected and the diameter of the annulus of oil increases again, and vice versa.

The invention is obviously not limited to what is shown and described. As a deviation from this, the shaft bearings 2 could be designed as double bearings (tandem bearings). Instead of one row of oil-trap holes 13 distributed around the periphery, two or more rows could be provided per hollow space. This consideration also applies to the ejection holes 15. It is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. In a centrifugal lubricating oil pump of an exhaust gas turbocharger having a casing and shaft bearing for supporting a turbocharger shaft, said lubricating oil pump comprising a pump rotor located on the turbocharger shaft which pump rotor is provided with air vent ducts, an oil suction pipe having a lower end which communicates with an oil sump and an upper end which communicates with a hollow annular chamber, which chamber receives a rotating annulus of oil during operation due to a centrifugal force effect, wherein the improvement comprises the pump rotor being provided with two laterally located hollow annular chambers and being fastened on the turbocharger shaft between two shaft bearings, the shaft bearings being each located between an oil suction pipe and a hollow annular chamber of the pump rotor, the oil being sucked from the oil sump through injection nozzles and through the shaft bearings.

2. The centrifugal lubricating oil pump in accordance with claim 1, wherein at least one of the bearings has an outer ring and an annular oil gap is located between the casing and an end surface, facing towards the injection nozzles, of the bearing outer ring and wherein an oil duct is located at contact surfaces between the casing and a cylindrical outer surface of the bearing outer ring and between the casing and an end surface, facing away from the injection nozzles, of the bearing outer ring.

3. The centrifugal lubricating oil pump in accordance with claim 1, wherein said rotor has ejection holes are located at said hollow space, the ejection holes being dimensioned and located at a radially outwards position such that the ejection holes receive a depth of cover from the rotating annulus of oil.

4. The centrifugal lubricating oil pump in accordance with claim 1, wherein the hollow space of the pump rotor includes an externally located pocket for separating dirt.

* * * * *